United States Patent
Petrohilos

[11] 3,765,774
[45] Oct. 16, 1973

[54] OPTICAL MEASURING APPARATUS

[75] Inventor: Harry G. Petrohilos, Yellow Springs, Ohio

[73] Assignee: Techmet Company, Yellow Springs, Ohio

[22] Filed: Jan. 31, 1972

[21] Appl. No.: 222,032

[52] U.S. Cl. ............... 356/156, 356/159, 356/160, 250/219 WD, 350/6, 350/7
[51] Int. Cl. .......................................... G01b 11/00
[58] Field of Search.................. 356/156, 159, 160, 356/167, 32, 33, 34; 250/219 TH, 219 WD, 219 LG; 350/6, 7; 340/268

[56] References Cited
UNITED STATES PATENTS

| | | | |
|---|---|---|---|
| 3,511,551 | 5/1970 | Matulka.................................. | 350/6 |
| 3,687,556 | 8/1972 | Price...................................... | 350/7 |
| 3,592,545 | 7/1971 | Paine et al............................ | 356/32 |

FOREIGN PATENTS OR APPLICATIONS

| | | | |
|---|---|---|---|
| 384,874 | 2/1965 | Switzerland......................... | 356/159 |
| 189,415 | 3/1964 | Sweden............................... | 356/160 |

*Primary Examiner*—Benjamin A. Borchelt
*Assistant Examiner*—S. C. Buczinski
*Attorney*—William R. Jacox et al.

[57] ABSTRACT

A narrow laser beam is directed towards a mirror which is positioned at an angle of 45° relative to the path of the beam and which is rotated by a motor having an axis aligned with the beam to effect rotary planar scanning or sweeping of a lens constructed to convert the rotary scanning beam into a parallel scanning beam. An article to be measured is positioned in the path of the parallel scanning beam at generally the focal point of the lens, and the interruptions of the parallel scanning beam, as produced by the article, are sensed by a photodetector. The photodetector transmits corresponding pulses or signals through an amplifier to an edge decoder which receives a reset signal with each pass of the scanning beam. The edge decoder provides for selecting different combinations of signals received from the amplifier and controls the counting of constant pulses received by a counter from a high frequency generator or clock so that the counted pulses correspond to the dimension of the article at the plane of the parallel scanning beam. Preferably, the motor which rotates the scanning mirror is supplied with power from the clock through an adjustable frequency divider, and the amplified signals from the photodetector are compared with a reference level to provide an automatic gain control for the amplifier.

22 Claims, 4 Drawing Figures

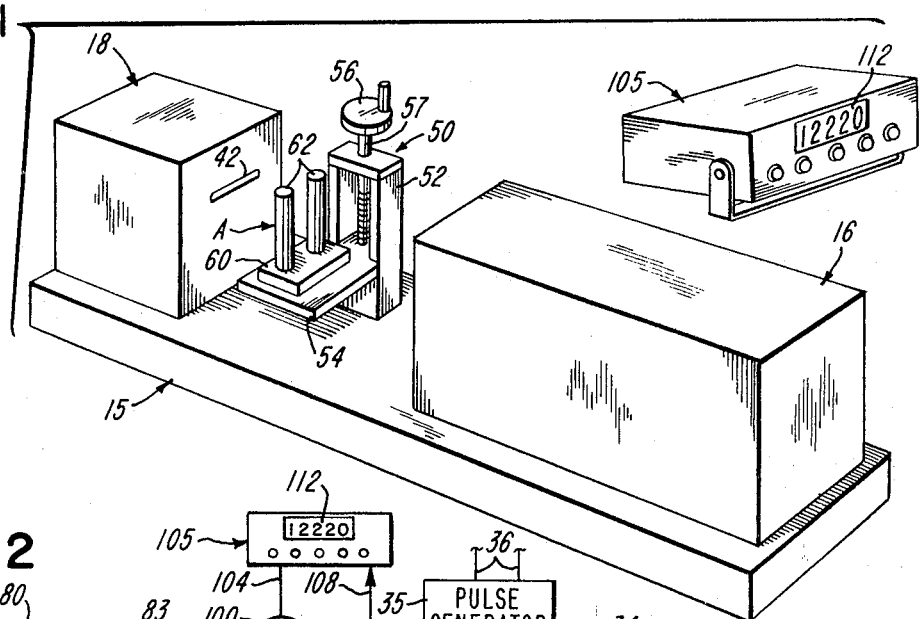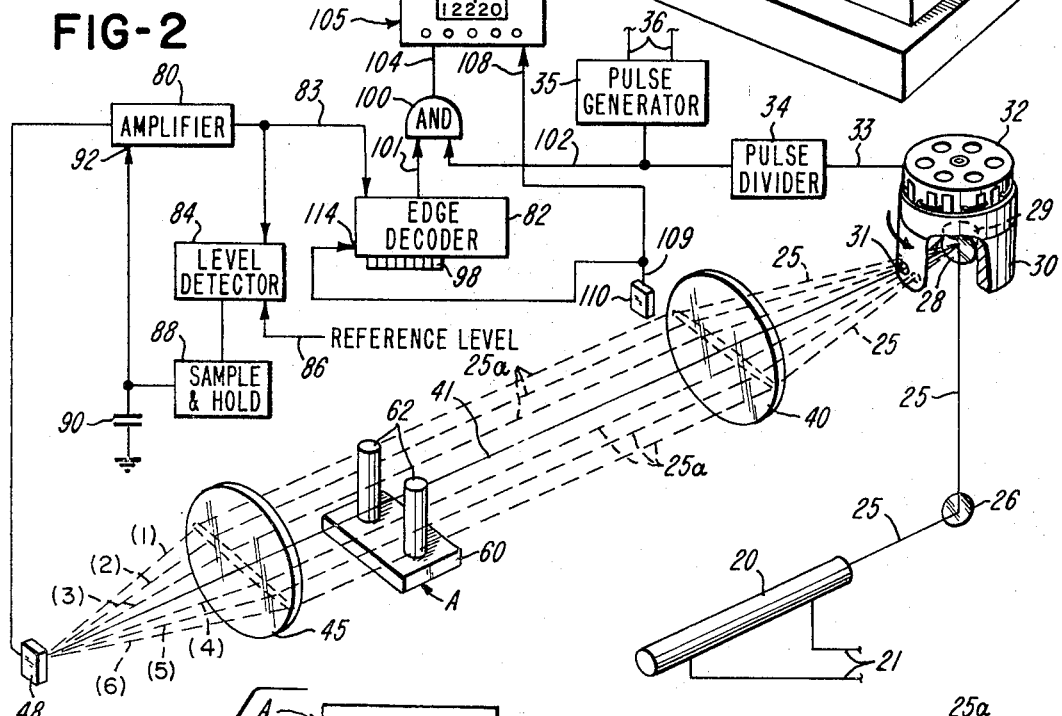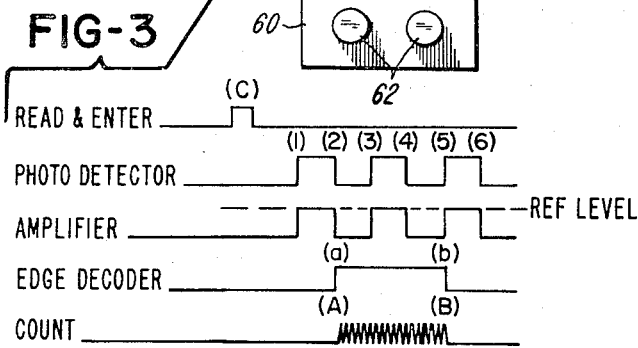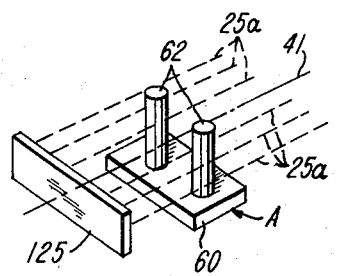

3,765,774

OPTICAL MEASURING APPARATUS

BACKGROUND OF THE INVENTION

There have been a number of devices constructed or proposed for optically measuring a dimension of an object or the distance between two objects, and which use a scanning light beam from a light source such as a laser. Some of the devices time the interruption of the scanning light beam as it is directed either across the object to be measured or across an opaque reference area within the space to be measured between the objects. For example, U.S. Pat. No. 3,533,701 disclosed an optical gauge wherein a parallel scanning light beam is produced and reflected by a set of opposing reflecting elements mounted on either a corresponding set of endless belts or on the outer surfaces of corresponding cylinders driven in synchronism. U.S. Pat. No. 3,434,7-85 disclosed an optical distance meter wherein a constant width light beam is oscillated back and forth across an opaque object located between two articles spaced at a distance to be measured. It has also been proposed to bounce a laser beam off a revolving polygon against a mirror and then through a scanning lens and across a zone through which a bar or rod is passing. The beam is then directed through another lens and onto a silicone diode which produces signals corresponding to the diameter of the bar or rod.

It is desirable for such an optical measuring device to be of simplified, practical and economical construction and to provide for producing a precision readout within a tolerance of at least plus or minus .001 inch. It is also desirable for such a device to be durable in construction and to provide for selectively measuring both inside and outside dimensions of some objects or articles. Furthermore, it is highly desirable for the optical measuring device to compensate automatically for fluctuations in the power supply and to provide for dependable maintenance-free operation. As is apparent after carefully analyzing the optical measuring devices disclosed in the above patents, each of the devices is lacking in providing one or more of these desirable features.

SUMMARY OF THE INVENTION

The present invention is directed to an improved optical measuring apparatus which provides all of the above desirable features and advantages and, in addition, may be conveniently adapted for optically determining the dimensions of a plurality of objects regardless of whether the objects are stationary or moving. The measuring apparatus of the invention also provides for convenient and rapid calibration after the apparatus is set up for use.

In accordance with one of the illustrated embodiments of the invention, the optical measuring device generally includes a light source in the form of a laser which produces a narrow light beam having a diameter of approximately 1 millimeter. The light beam is converted into a rotary scanning light beam by a first surface mirror which is positioned within the path of the light beam at an angle of 45°. The mirror is mounted on a flywheel driven directly by a synchronous motor receiving a power supply from a high frequency pluse generator or clock through an adjustable frequency divider.

The rotary scanning light beam is directed through a scanner lens which converts the rotary scanning light beam to a parallel scanning light beam, and the article or object to be measured is located at approximately the focal point of the lens where the diameter of the light beam is minimized. The parallel scanning light beam is sensed by a photodetector which produces pulses or signals when the light reaching the photodetector changes in intensity. The signals are amplified and transmitted to a decoder which incorporates means for selecting different combinations of the signals according to the dimension to be measured.

The decoder transmits the selected signals to a gate which also receives the high frequency pulses from the clock, and the output of the gate is transmitted to a pulse counter calibrated so that each counted pulse represents a finite unit of length such as 0.0005 inch. The output of the pulse counter controls a digital readout display. Preferably, the amplifier is provided with a circuit which compares the signal output of the amplifier with a reference level and provides an automatic gain control to assure that each signal from the amplifier is held at the reference level.

Other features and advantages of the invention will be apparent from the following description, the accompanying drawing and the appended claims.

BRIEF DESCRIPTION OF THE DRAWINGS

FIG. 1 is a perspective view of optical measuring apparatus constructed in accordance with the invention;

FIG. 2 is a schematic perspective view of the major components of the apparatus shown in FIG. 1, illustrating their general physical arrangement and the electrical circuitry of the apparatus;

FIG. 3 is a chart illustrating the output pulses or signals produced by some of the electrical components shown in FIG. 2; and FIG. 4 is a fragmentary perspective view of a modification of the invention.

DESCRIPTION OF THE PREFERRED EMBODIMENTS

The optical measuring apparatus shown in FIGS. 1 and 2 includes an elongated base housing 15 having one end portion supporting a light projector housing 16 and an opposite end portion supporting a light receptor housing 18. An elongated light source in the form of a helium neon laser 20 extends horizontally within the base housing 15 and has conductors 21 adapted to be connected to a suitable power supply. The laser 20 produces a coherent light beam which is represented by the dotted line 25 and has a diameter of approximately one millimeter. In operation of the laser 20, it has been found that the light beam 25 varies between 0.8 and 1.5 millimeters in diameter.

A circular disc-like first surface mirror 26 is rigidly supported at one end of the base housing 15 and reflects the light beam 25 upwardly into the projector housing 16. Another first surface mirror 28 is positioned in the path of the upwardly projected light beam 25 and is mounted on a stud 29 within the center of an inverted cup-shaped aluminum flywheel 30. The flywheel 30 is mounted directly on the shaft of a 24 volt A.C. synchronous hysteresis motor 32 which is rigidly supported within the upper portion of the housing 16. The flywheel 30 has a radially extending opening 31 through which the light beam 25 is reflected.

The motor 32 is operated by a 60 hertz power supply transmitted through a conductor 33 extending from a pulse or frequency divider 34 connected to a high frequency pulse generator or clock 35. The clock 35 has conductors 36 for receiving power from a 110 volt AC power supply and produces output pulses at a frequency of 6 megahertz. The frequency divider 34 divides the high frequency pulses from the clock 35 to the 60 hertz power supply for the motor 32 and incorporates an adjustment for varying the division to provide the operator of the apparatus with means for calibrating the apparatus after it is energized. The rotational axis of the motor 32 and the flywheel 30 is precisely aligned with the upwardly directed light beam 25, and the mirror 28 is positioned precisely at 45° relative to the light beam so when the flywheel 30 and mirror 28 rotate, the light beam 25 is converted into a rotary scanning light beam in a substantially horizontal plane.

A circular scanner lens 40 is positioned with its optical axis 41 in the planar path of the rotary scanning light beam 25 and converts the rotary scanning light beam 25 into a parallel scanning light beam 25 as represented by the parallel lines 25a extending from the lens 40. The motor 32 rotates the mirror 28 at 600 rpm so that the reflected light beam 25 scans the lens 40 at ten times per second. The parallel scanning light beam 25 is adapted to pass through a horizontal slit 42 (FIG. 1) formed within the light receptor housing 18. Another circular lens 45 is positioned with its optical axis the same as the axis 41 and is located adjacent the slit 42 to converge or focus the parallel scanning light beam onto the photosensitive surface of a photocell or photodetector 48 which is also enclosed within the housing 18 and located on the optical axis 41 of the lenses 40 and 45.

Referring to FIG. 1, an article or object positioning device 50 is mounted on the base housing 15 within the gap or space defined between the housing 16 and 18 and includes an upwardly projecting pedestal or frame 52. A rectangular platform or table member 54 is supported for vertical sliding movement on the frame 52. The table member 54 is adjustable vertically by rotation of a crank wheel 56 mounted on the upper end portion of an adjustment screw 57 extending vertically within the frame 52 and threadably engaging the table member 54. The center of the table 54 is located at the focal point of the scanner lens 40 where the diameter of the parallel scanning light beam 25 is minimized at approximately 0.005 inch.

The table member 54 is adapted to support an object or article A which has one or more dimensions to be measured. For purposes of illustration only, the article A includes a base plate 60 which supports two parallel spaced vertical studs or posts 62. The table member 54 has been adjusted until the posts 62 project into the path of the parallel scanning light beam 25. As will be explained later, the measuring apparatus of the invention may be adjusted to measure the diameter of either of the posts 62, or the width of the space between the posts or the overall dimension of the posts. It is to be understood that the measuring apparatus of the invention may be adapted for measuring the dimension of any object whether the object is stationary or moving as, for example, for monitoring of the diameter of a wire being drawn. The term article as used herein, is intended to include any object, part, etc.

Referring to FIG. 2, each pulse or signal received by the photodetector 48 is transmitted to an amplifier 80, and the amplified output signal from the amplifier 80 is transmitted to an edge decoder 82 by a conductor 83. Preferably, a level detector 84 is joined to the output of the amplifier 80 and is provided with a source 86 of a reference level signal which is transmitted to a sample and hold device 88. The sample and hold device 88 is connected to a capacitor 90 and to an amplifier terminal 92, and cooperates with the level detector 84, the level signal source 86 and the capacitor 90 to provide the amplifier 80 with an automatic gain control.

That is, the amplitude of the output of the amplifier 80 is compared with a reference amplitude level produced in the level detector 84. If, for example, the amplitude of the output signal from the amplifier 80 is less than the reference amplitude level, an error signal is transmitted by the level detector 84 through the sample and hold device 88 to the capacitor 90 for charging thereof. The gain of the amplifier 80 is increased until the amplitude of the output signal of the amplifier 80 is equal to the amplitude of the reference level signal. In a like manner, if the amplitude of the output signal of the amplifier 80 is too high, the level detector 84, the sample and hold device 88 and the capacitor 90, cause the amplitude of the output signal of the amplifier 80 to be adjusted to the amplitude of the source 86 of reference level signal. An output signal which is constant in amplitude is thus transmitted by the amplifier 80 to the edge decoder 82 through the conductor 83.

Preferably, the edge decoder 82 is a multiple-bit, parallel-in, serial-out shift register and is provided with a decode mode switch section 98 which is adjustable to establish a desired mode in which the edge decoder provides output signals to an AND gate 100 through a conductor 101. The gate 100 is provided with an input conductor 102 leading from the pulse generator or clock 35. A conductor 104 conducts the output of the gate 100 to a combined display and counter device 105 which has a "read" input terminal 108 connected by a conductor 109 to a photodetector 110 located adjacent the lens 40 in the path of the rotary scanning light beam 25. The display and counter device 105 includes solid state binary elements which count the pulses received from the gate 100 and provides a digital display 112 (FIG. 1) calibrated to correspond to the distance of lateral movement of the parallel scanning light beam 25 during the pulses selected by the switch section 98.

Before the light beam 25 scans article A located on the table member 54, the beam energizes the photodetector 110, and a pulse or signal is transmitted by the conductor 109 to the terminal 108 of the display and counter 105 and also to a terminal 114 of the edge decoder 82. This signal is illustrated by reference (c) in FIG. 3 and is discussed further below.

The rotary scanning beam 25 then intersects the leading edge of the lens 40 and creates a rise in the amplitude of the signal from the photodetector 48 as indicated by reference (1) in the photodetector output signals shown in FIG. 3. The level of the output signal of the photodetector 48 remains high until the beam reaches the outer edge of the first post 62 of the article A, as indicated by reference (2) in FIG. 3. The photodetector output signal then remains low until the beam passes the inner edge of the first post 62, as indicated by reference (3) in FIG. 3. The output signal of the photodetector 48 then rises at reference (3) and remains in a high state until the beam intersects the inner edge of the second post 62 as indicated by reference (4). The output signal remains in a low state until the beam passes the outer edge of the second post 62, as indicated by reference (5). The output signal remains high until the beam passes the lens 40, as indicated by the spacing between (5) and (6), and then the signal remains low until the beam again arrives at the leading edge of the lens as indicated by reference (1). FIG. 3 also includes an illustration of the output signal of the amplifier 80 as a result of the signal provided by the photodetector 48 and illustrates that the maximum amplitude of the output of the amplifier 80 is maintained at a constant value equal to the reference level established in the level detector 84, as discussed above.

Any desired mode of the output of the edge decoder 82 may be selected by use of the decode mode switch section 98 of the edge decoder 82. If the distance from the outer edge of the first post 62 to the outer edge of the second post 62, i.e., the overall distance of the posts 62, is to be measured, the decode mode switch section 98 of the edge decoder 82 is set so that the output signal of the edge decoder 82 changes to a high state when the signal to the edge decoder 82 from the amplifier 80, becomes high as a result of intersection of the beam with the outer edge of the first post 62, as indicated by reference (a) in FIG. 3.

The decode mode switch section 98 is set so that the output signal of the edge decoder 82 remains in a high state until the beam passes the outer edge of the second post 62, as indicated by reference (5) in FIG. 3. Thus the signal transmitted to the AND gate 100 through the conductor 104, changes from a low state to a high state as the parallel scanning beam intersects the outer edge of the first post 62 and remains in a high state until the beam passes the outer edge of the second post 62.

The clock 35 is continuously providing pulses of a high frequency through the conductor 102 and the AND gate 100. However, these pulses from the clock 35 pass through the AND gate 100 to the display and counter device 105 only during the period of time that the signal transmitted to the AND gate 100 through the conductor 104 is in the high state. Thus, when the decode mode switch section 98 is set in the manner discussed above, pulses generated in the clock 35 travel through the AND gate 100 to the display and counter device 105 only during the period of time that the parallel scanning light beam 25 is traveling from the outer edge of the first post 62 to the outer edge of the second post 62.

These pulses are illustrated in FIG. 3 between references A and B and are counted in the display and counter unit 105. Since the pulse divider 34 precisely relates the output signal of the clock 35 to the scan travel of the beam 25, the number of pulses per unit length of linear measurement is constant, even if there should be a long term drift in frequency of the output signal of the clock 35. By properly scaling the pulse divider 34, the display provided by the counter unit 105 may be in units of linear measurement corresponding precisely to the distance between the outer edge of the first post 62 and the outer edge of the second post 62.

As mentioned above, each time the beam 25 intercepts the photodetector 110, a signal is created as represented by (c) in FIG. 3, and is transmitted to the edge decoder 82 through the terminal 114. This signal thus causes the pattern set by the mode switch section 98 to enter the edge decoder 82. The signal from the photodetector 110 also reaches the display and counter device 105 through the terminal 108 and resets the counter portion of the display and counter device 105.

As also stated above, the decode mode switch section 98 of the edge decoder 82 may be adjusted to provide a reading on the display corresponding to the distance between any combination of two of the signals represented by the reference (2) – (5). Furthermore, by the use of a plurality of display and counter devices 105, AND gates 100, and a modified edge decoder 82, a plurality of linear measurements can be provided during each scan of a single parallel scanning light beam. For example, the diameters of both of the posts 62 could be displayed on two devices 105.

It is also to be understood that the display portion of the device 105 need not be used. For example, if the object being measured is a moving continuous member such as a strip or wire or the like which is being produced or formed immediately before measurement by apparatus of the invention, measurements signals may be sensed and counted by apparatus of this invention and be transmitted to means for automatically controlling the dimension of the strip or wire or the like during production or forming thereof.

Referring to FIG. 4 which shows a modification of the measuring apparatus of the invention, the lens 45 and the photodetector 48 as shown in FIG. 2, are replaced by an elongated photocell or photodetector 125 which extends across the path of the parallel scanning light beam 25 normal to the light beam. The photodetector 125 has sufficient length to receive the entire parallel scanning light beam as represented by the lines 25a and is capable of producing all of the signals represented by the references (1) and (6). Preferably, the photodetector 125 is located in the place of the lens 45 and directly in back of the slot 42 within the light receptor housing 18, thereby providing for a reduction in the length of the housing 18.

From the drawing and the above description, it is apparent that an optical measuring apparatus cnstructed in accordance with the invention, provides desirable features and advantages. For example, the rotation of the mirror 28 on an axis precisely aligned with the narrow light beam 25 is effective to produce a rotary scanning light beam within a plane, and with suitable choice of the focal length of the lens 40, the lens 40 effectively converts the rotary scanning light beam into a parallel scanning light beam which travels laterally at a substantially uniform rate. Thus when an article is placed within the path of the parallel scanning light beam, the blackout time of the light beam, which is sensed by the photodetector 48 or 125, corresponds precisely to the dimension of the article represented by the interruptions of the parallel scanning light beam. This structure also provides for economical construction.

Furthermore, the location of the article at the focal point of the lens 40 where the diameter of the light beam 25 is minimized, assures precise actuation of the photodetector 48 or 125. In addition, the edge decoder 82 and the decode mode switch section 98 provide for selectively measuring different dimensions of an article, for example, inside diameters and outside diameters of an annular part, or different dimensions of an assembled part, as discussed above in connection with the article A.

Another important advantage is provided by the adjustable frequency divider 34 which supplies power from the pulse generator or clock 35 to the motor 32.

That is, the frequency divider 34 may be conveniently adjusted so that the operator of the apparatus may quickly and conveniently set the precise speed of the motor 32 and thus the lateral travel of the parallel scanning light beam 25 with the pulses produced by the frequency generator or clock 35 after the apparatus is energized. A further advantage is provided by the level detector 84, the sample and hold device 88 and the capacitor 90. These components assure that the output signals from the amplifier 80 remain at a constant reference level as indicated in FIG. 3 so that the apparatus provides for dependable operation.

While the forms of measuring apparatus herein described constitute preferred embodiments of the invention, it is to be understood that the invention is not limited to these precise forms of apparatus, and that changes may be made therein without departing from the scope and spirit of the invention.

The invention having thus been described, the following is claimed:

1. An improved optical measuring apparatus comprising a light source effective to produce a narrow light beam, a reflecting member positioned within the path of the light beam at an angle of 45° with respect to the path of the light beam, a motor connected to rotate the reflecting member at a constant rate on an axis aligned with the narrow light beam to scan the light beam within a plane, means for converting the rotary scanning light beam into a parallel scanning light beam, photodetector means for sensing the parallel scanning light beam and for producing electrical signals in response to interruptions of the light beam by an article positioned within the path of the parallel scanning light beam, and means controlled by signals produced by said photodetector means for producing an output signal corresponding to the time between predetermined signals produced by said photodetector means.

2. Improved optical measuring apparatus comprising a light source effective to produce a narrow light beam, means for rotating the light beam about a predetermined axis to scan the light beam within a plane, including a rotary scanning member having a reflecting surface positioned within the path of the narrow light beam from said light source at an angle of 45°, and motor means connected to rotate said scanning member on an axis aligned with the narrow light beam from said light source, means for converting the rotary scanning light beam into a parallel scanning light beam, photodetector means for sensing the parallel scanning light beam and for producing electrical signals in response to interruptions of the light beam by an article positioned within the path of the parallel scanning light beam, pulse generator means for producing pulses at a constant frequency, counting means for counting the pulses, and means for controlling said counting means in response to the operation of said photodetector means to provide for counting of the pulses which occur between predetermined signals produced by the photodetector means.

3. An optical measuring apparatus as defined in claim 2 including frequency divider means for dividing the pulses from said pulse generator means to a predetermined frequency for operation of said motor, and conductor means connecting said frequency divider means to said motor.

4. An optical measuring apparatus as defined in claim 3 wherein said frequency divider means is adjustable to provide for adjusting the ratio between the frequency of the pulses counted by the counting means and the rate of rotation of the rotating light beam.

5. An optical measuring apparatus as defined in claim 2 including means for amplifying the signals produced by said photodetector means, and automatic gain control means for maintaining the amplified signals at a substantially constant level of amplitude.

6. An optical measuring apparatus as defined in claim 2 wherein said photodetector means is elongate and within the planar path of the parallel scanning light beam normal to the light beam.

7. An optical measuring apparatus as defined in claim 2 wherein said light source comprises an elongate laser, and including an elongate base housing enclosing said laser, a projector housing projecting upwardly from one end portion of said base housing and enclosing said means for rotating the light beam and said means for converting the rotary scanning light beam into a parallel scanning light beam, a light beam receptor housing projecting upwardly from the opposite end portion of said base housing and enclosing said photodetector means, and said projector housing and said receptor housing defining an article receiving zone therebetween for receiving the article to be measured.

8. An optical measuring apparatus as defined in claim 2 wherein said controlling means comprise a multiple mode decoder, and a digital display unit controlled by said counting means and calibrated to produce a visual readout corresponding to the dimension being measured.

9. Optical measuring apparatus as defined in claim 2, wherein the means for converting the rotary scanning light beam into a parallel scanning light beam includes a first lens, an article to be measured being positioned substantially at the focal point of the first lens, the apparatus also including a second lens for focusing the parallel scanning light beam on said photodetector means, said lens being spaced from said light beam converting means to define a zone for receiving the article to be measured.

10. An improved optical measuring apparatus comprising a laser effective to produce a narrow light beam, a reflecting member positioned within the path of the light beam at an angle of 45° with respect to the path of the light beam, a motor connected to rotate the reflecting member at a constant rate on an axis aligned with the narrow light beam to scan the light beam within a plane, a lens positioned with its optical axis in the plane and effective to convert the rotary scanning light beam into a parallel scanning light beam, means for sensing the parallel scanning light beam and for producing electrical signals in response to interruptions of the light beam by an article positioned within the path of the parallel scanning light beam at generally the focal point of the lens, clock means for producing pulses at a constant frequency, means for counting the pulses, and means for controlling said counting means in response to the operation of said sensing means to provide for counting of the pulses between predetermined electrical signals.

11. An optical measuring apparatus as defined in claim 10 including a flywheel connected to said reflecting member to effect rotation of said reflecting member at a precise constant speed.

12. An optical measuring apparatus as defined in claim 10 wherein said sensing means is effective to sense a series of signals with each scan of the parallel scanning light beam corresponding to interruptions resulting from the configuration of the article being measured, a decoder for receiving the signals from said sensing means, and said decoder having switch means for changing the mode of decoding the signals for selectively controlling the signals transmitted to said counting means from said sensing means according to a particular dimension measurement desired of the article being measured.

13. An optical measuring apparatus as defined in claim 10 including a frequency divider for dividing the signals from said clock means to the predetermined frequency of said motor, and conductor means connecting said frequency divider to said motor.

14. An improved optical measuring apparatus comprising a laser effective to produce a narrow light beam, a first surface mirror positioned within the path of the light beam at an angle of 45° with respect thereto, a motor connected to rotate the first surface mirror at a constant rate on an axis aligned with the narrow light beam to scan the light beam within a plane, a lens positioned with its optical axis in the plane and effective to convert the rotary scanning light beam into a parallel scanning light beam, a photodetector for sensing the parallel scanning light beam and for producing electrical signals in response to interruptions of the light beam by an article positioned within the path of the parallel scanning light beam at generally the focal point of the lens, clock means for producing pulses at a constant frequency, means for counting the pulses, a multiple mode decoder connected to receive the signals from said photodetector and having means for selecting different decoding modes of the signals, and means for controlling said counting means in response to the operation of said decoder to provide for counting of the pulses which occur during a time period established by the signals corresponding to a selected decoding mode.

15. An improved optical measuring apparatus comprising a light source effective to produce a narrow light beam, means for converting the narrow light beam into a parallel scanning light beam, including a reflecting member positioned within the path of the light beam at an angle of 45° with respect to the path of the narrow light beam, motor means connected to rotate the reflecting member at a constant rate on an axis aligned with the narrow light beam from the light source, a photodetector for sensing the parallel scanning light beam and for producing electrical signals in response to interruptions of the light beam by an article positioned within the path of the parallel scanning light beam, clock means for producing pulses at a constant frequency, means for counting the pulses, a multiple mode decoder connected to receive the signals from said photodetector and having means for selecting different decoding modes of the signals, and means for controlling said counting means in response to the operation of said decoder to provide for counting of the pulses which occur during a time period established by the signals corresponding to a selected decoding mode.

16. Apparatus of the type which employs a moving beam of light for measuring a dimension of an object, comprising a light source which produces a narrow light beam, means for rotatively moving the light beam about a given axis and within a given plane, including a reflecting member positioned within the path of the light beam at an angle of 45° with respect to the path of the narrow light beam, motor means connected to rotate the reflecting member at a constant rate on an axis aligned with the narrow light beam from the light source, means for converting the movement of the light beam from rotative movement to parallel linear movement within the plane of an object for measuring a dimension thereof as the light beam scans the object at a given frequency, light sensing means for sensing light received from the light beam, the light sensing means producing electrical signals in response to changes in intensity of the light which reaches the light sensing means as the intensity of the light reaching the light sensing means changes in intensity as the light beam scans the object, pulse generator means for producing pulses of electrical energy at a given frequency, counting means for counting pulses of electrical energy, control means, means joining the control means to the light sensing means and to the counting means for control of the flow of pulses of electrical energy from the pulse generator means to the counting means for counting thereof.

17. A method of measuring a dimension of an article comprising the steps of producing a narrow light beam, positioning a reflecting member within the path of the narrow light beam at an angle of 45° with respect to the path of the narrow light beam, rotating the reflecting member at a constant rate on an axis aligned with the narrow light beam to provide a rotary scanning light beam to scan the narrow light beam within a plane, converting the rotary scanning light beam into a parallel scanning light beam, positioning the article within the path of the parallel scanning light beam, sensing the parallel scanning light beam and producing electrical signals in response to interruptions of the light beam by the article, producing pulses at a constant frequency, and counting the pulses occurring between predetermined electrical signals produced by the interruptions of the light beam.

18. A method as defined in claim 17 including the step of dividing the constant frequency pulses to produce pulses at a substantially lower frequency, and wherein the reflecting member is rotated by a motor operated by the lower frequency pulses.

19. A method as defined in claim 17 including the step of amplifying the electrical signals produced by the interruptions of the light beam, and controlling the amplification of the signals in reference to a constant level voltage source.

20. Improved optical measuring apparatus comprising a light source effective to produce a narrow light beam, a reflecting member positioned within the path of the light beam at an angle of 45° with respect to the path of the light beam, a motor connected to rotate the reflecting member on an axis aligned with the narrow light beam to scan the light beam within a plane so that the light beam always engages the same point on the reflecting member, means for converting the rotary scanning light beam into a parallel scanning light beam, including a scanning lens having a predetermined focal point, photodetector means for sensing the parallel scanning light beam and for producing electrical signals in response to interruptions of the light beam by an article positioned within the path of the parallel scanning light beam, said photodetector means being spaced from said lens by a distance greater than the position of said focal point, means for locating the article to be measured at substantially the focal point of said lens, pulse generator means for producing pulses at a constant frequency, counting means for counting the pulses, and means for controlling said counting means in response to the operation of said photodetector means to provide for counting of the pulses which occur between predetermined signals produced by the photodetector means.

21. Improved optical measuring apparatus comprising a light source effective to produce a narrow light beam, means for rotating the light beam about a predetermined axis to scan the light beam within a plane, means for converting the rotary scanning light beam into a parallel scanning light beam, photodetector means for sensing the parallel scanning light beam and for producing electrical signals in response to interruptions of the light beam by an article positioned within the path of the parallel scanning light beam, said photodetector means being effective to sense a series of signals with each scan of the parallel scanning light beam corresponding to interruptions produced by the configuration of the article being measured, a decoder for receiving the signals from said photodetector means, said decoder having means for changing the mode of decoding the signals for selectively controlling the signals transmitted to said counting means from said photodetector means according to a particular dimension measurement desired regarding the article being measured, pulse generator means for producing pulses at a constant frequency, counting means for counting the pulses, and means for controlling said counting means in response to the operation of said photodetector means to provide for counting of the pulses which occur between predetermined signals produced by the photodetector means.

22. Optical measuring apparatus comprising a light source effective to produce a narrow light beam, a reflecting member positioned within the path of the narrow light beam at an angle of 45° with respect to the path of the light beam, means for rotating the reflecting member on an axis aligned with the narrow light beam so that the light beam always engages the same point on the reflecting member to scan the light beam within a plane, a scanning lens having a predetermined focal point, the scanning lens being positioned with respect to the reflecting member so that the point on the reflecting surface which is engaged by the light beam is at the focal point of the scanning lens, so that the light beam after passing through the scanning lens is a parallel scanning light beam, photodetector means for sensing the parallel scanning light beam and for producing electrical signals in response to interruptions of the light beam by an article positioned between the scanning lens and the photodetector means within the path of the parallel scanning light beam, pulse generator means for producing pulses at a constant frequency, counting means for counting the pulses, and means controlling said counting means in response to the operation of said photodetector means to provide for counting of the pulses which occur between predetermined signals produced by the photodetector means.

* * * * *